Z. GORA.
CUTTER AND GRATER.
APPLICATION FILED FEB. 11, 1918.
1,284,314.
Patented Nov. 12, 1918.
2 SHEETS—SHEET 1.
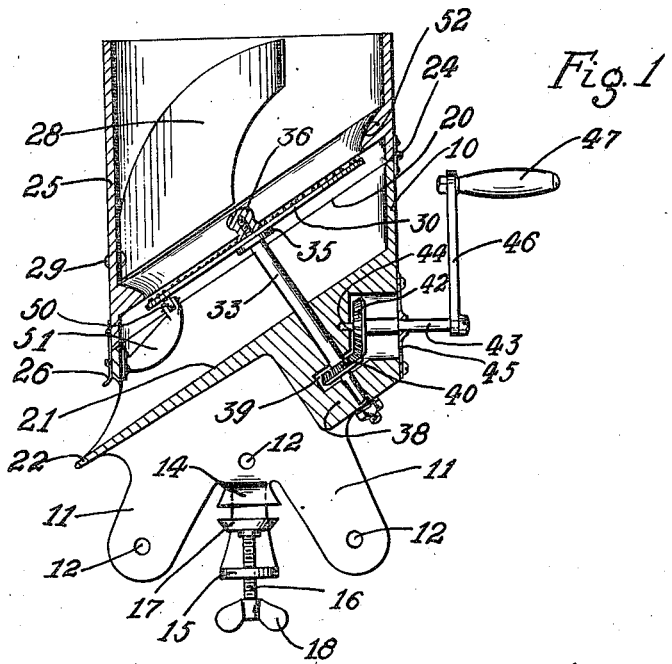
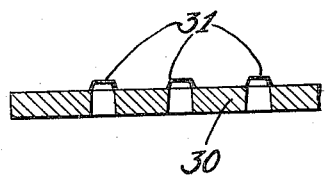
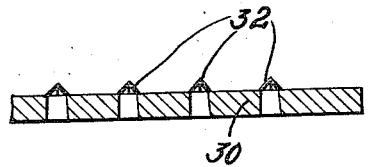
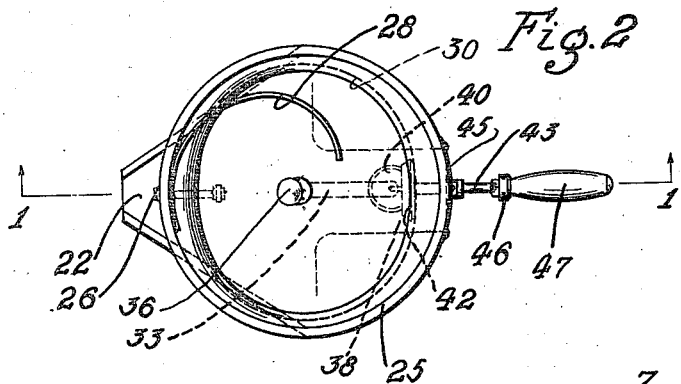
INVENTOR
Zahary Gora
BY
ATTORNEY Z. GORA.
CUTTER AND GRATER.
APPLICATION FILED FEB. 11, 1918.
1,284,314.
Patented Nov. 12, 1918.
2 SHEETS—SHEET 2.
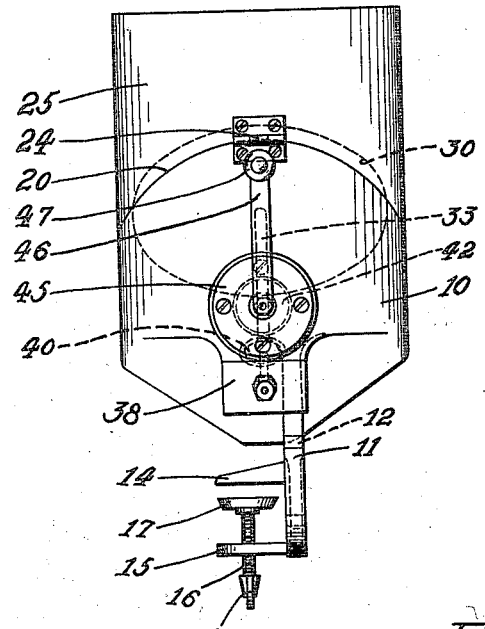
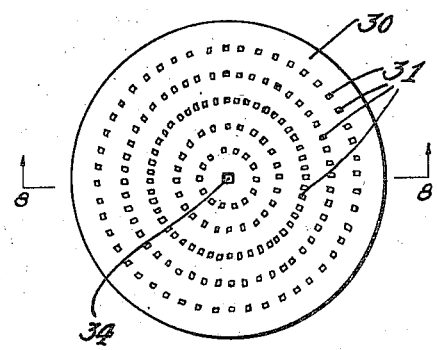
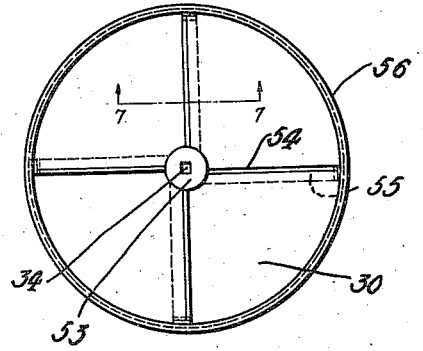
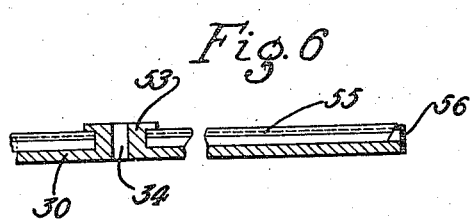
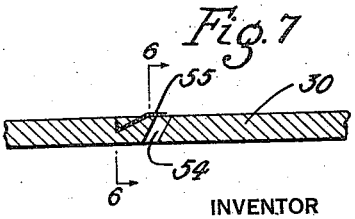
INVENTOR
Zahary Gora
BY
ATTORNEY

UNITED STATES PATENT OFFICE.

ZAHARY GORA, OF JERSEY CITY, NEW JERSEY.

CUTTER AND GRATER.

1,284,314.     Specification of Letters Patent.     Patented Nov. 12, 1918.

Application filed February 11, 1918. Serial No. 216,451.

*To all whom it may concern:*

Be it known that I, ZAHARY GORA, a citizen of Russia, resident of Jersey City, county of Hudson, and State of New Jersey, have invented certain new and useful Improvements in Cutters and Graters, of which the following is a specification.

This invention relates to improvements in culinary utensils and particularly to those used in cutting, slicing, grating or disintegrating various articles of food and has as its special object the provision of an apparatus adapted to be firmly secured at any location and manually operated so as to produce the above results in an effective manner.

Another object is to provide means whereby cutter blades for producing different results may be interchangeably engaged within the mechanism so as to produce either a grating or slicing effect as may be desired.

A still further object is to provide means whereby the articles may be entered or removed from the machine in a convenient manner.

These and other like objects are attained by the novel construction and combination of parts hereinafter described and shown in the accompanying drawings, forming a material part of this disclosure, and in which:—

Figure 1 is a vertical sectional view of an apparatus made in accordance with the invention, the section being taken on line 1—1 of Fig. 2.

Fig. 2 is a top plan view of the machine.

Fig. 3 is a side elevational view of the same.

Fig. 4 is a plan view of one of the grating blades.

Fig. 5 is a similar plan view showing a blade used as a slicer.

Fig. 6 is an enlarged fragmentary sectional view taken on line 6—6 of Fig. 7.

Fig. 7 is a fragmentary sectional view taken on line 7—7 of Fig. 5.

Fig. 8 is a fragmentary transverse sectional view taken on line 8—8 of Fig. 4.

Fig. 9 is a similar view of the same showing a modified form of tooth.

Referring to the drawings the numeral 10, designates a cylindrical casing having integrally formed with it depending lugs 11, through which are openings 12, adapted to receive screws or like securing means whereby the apparatus may be rigidly attached to a wall.

Extending outward to the front from the lugs 11, and centrally therewith, are projections 14 and 15, the former of which is adapted to overlay a projecting support like a shelf, while in the lower projection 15, is engaged a screw 16, having an enlarged rotatable cap 17, at the point immediately below the projection 14, the screw being provided with a winged head 18 by which it may be conveniently operated.

The upper edge 20, of the casing 10, is formed at an angle with the side walls and is provided with an inclined central recess 21, terminating in a chute 22, so that articles dropping therein upon its inclined surface, are carried out by gravity.

Fastened by hinges 24, to the highest part of the casing 10, is a second cylindrical casing, held at the front by a spring clip 26, immediately above the chute 22, this upper casing having an open top through which articles may be entered and rest against a curved interior plate 28, held by rivets 29, the plate acting as a guide for the articles which are received upon the upper surface of a cylindrical disk 30, having a plurality of raised cutters 31 as indicated in Figs. 4 and 8, or, as shown in Fig. 9, the cutters 32 may be angularly disposed, it being understood that the cutters are rigidly engaged with the upper surface of the disk. This disk is mounted upon an inclined shaft 33 having a square upper end adapted to engage in the rectangular opening 34, in the center of the disk which rests upon a flanged collar 35 fixed on the shaft and is held thereagainst by the threaded nut 36, engaging with the corresponding threaded end of the shaft 33.

From the drawings it will be seen that the shaft 33 is placed diagonally with respect to the central axis of the apparatus, the same passing through a projection 38 of the casing 10, and in which is a recess 39, containing a beveled gear 40 fixed on the shaft 33 and meshing with a mating gear 42, fixed near the end of a horizontal shaft 43, the extreme inner end 44 of which is journaled in the projection 38, while the outer end extends through a plate 45, and has rigidly engaged with it a lever 46 to which is attached the operating handle 47.

Due to the inclined position of the disk 30, the most of the weight will be received upon its lower edge, for which is provided a support roller 50, journaled in a bracket 51, secured at the lowermost corner of the main casing 10, adjacent to the integral ring 52 in which the disk rotates, the articles being held in contact with the teeth 31 or 32 of the disk.

Referring now more particularly to Fig. 5, one of the disks 30, is provided with a raised center 53 containing the squared opening 34, and also formed with opposed radial passages 54, over which are disposed knives 55, the same acting as shears as the disk is rotated, thereby slicing the ends of articles which are inserted through the upper casing 25, the cuttings dropping upon the inclined surface 21, and passing out through the chute 22.

In operation, articles having been entered through the open top either the grater or slicer disk being in position and clamped by the nut 26, the handle 47 is operated conveying motion to the disk which either disintegrates the article placed upon its surface or slices them according to which disk be used. These disks are readily removed by turning the upper portion 25 of the apparatus upon the hinged joint allowing ready access to all parts of the mechanism so that they may be kept in a clean and wholesome condition, while the cuttings, pass out through the chute 22, into any receptacle provided for that purpose.

Having thus described my invention what I claim as new and desire to secure by Letters Patent, is—

1. In a cutting machine for culinary operation, the combination with a fixed cylindrical base, said base being beveled at its upper portion, a casing hingedly engaged to said base, a guide plate carried in said casing, a disk rotatably mounted and adapted to extend upward into said casing, an inclined shaft upon which said disk is mounted, and means for rotating said shaft whereby said cutter disk is rotated.

2. In a slicing machine, the combination with a cylindrical frame, of an inclined internal chute formed in the lower portion of said frame, said frame having an angular open top, a casing hingedly engaged to said frame, a guide plate rigidly secured in said casing, a toothed disk mounted in an inclination relative to the axis of said frame, and means for rotating said disk.

In testimony whereof I have affixed my signature.

ZAHARY GORA.